US012639085B1

(12) United States Patent
Thukkaram et al.

(10) Patent No.: US 12,639,085 B1
(45) Date of Patent: May 26, 2026

(54) CROSS-APPLICATION WALKTHROUGH GUIDES FROM DESKTOP APP TO DESKTOP APP, DESKTOP APP TO BROWSER AND BROWSER TO DESKTOP APP

(71) Applicant: Whatfix Private Limited, Bangalore (IN)

(72) Inventors: Muthukrishnan Thukkaram, Bangalore (IN); Rahul Mhambrey, Bangalore (IN)

(73) Assignee: Whatfix Private Limited, Bangalore (IN)

( * ) Notice: Subject to any disclaimer, the term of this patent is extended or adjusted under 35 U.S.C. 154(b) by 193 days.

(21) Appl. No.: 18/307,280

(22) Filed: Apr. 26, 2023

(51) Int. Cl.
G06F 9/451 (2018.01)
G06F 9/54 (2006.01)

(52) U.S. Cl.
CPC .............. *G06F 9/451* (2018.02); *G06F 9/541* (2013.01)

(58) Field of Classification Search
CPC .................................. G06F 9/451; G06F 9/541
See application file for complete search history.

(56) References Cited

U.S. PATENT DOCUMENTS

| | | | | |
|---|---|---|---|---|
| 11,461,090 B2 | 10/2022 | Namburu et al. | | |
| 2002/0054587 A1 * | 5/2002 | Baker | ................. | G06Q 20/382 |
| | | | | 707/E17.107 |

| | | | | |
|---|---|---|---|---|
| 2005/0198618 A1 * | 9/2005 | Lalonde | .................... | G06F 8/34 |
| | | | | 717/110 |
| 2007/0208606 A1 * | 9/2007 | Mackay | ........... | G06Q 10/06316 |
| | | | | 705/7.17 |
| 2008/0243902 A1 * | 10/2008 | Rong | ..................... | G06Q 10/06 |
| | | | | 707/999.102 |
| 2009/0172565 A1 * | 7/2009 | Jackson | .................. | H04L 67/10 |
| | | | | 715/753 |
| 2011/0099602 A1 * | 4/2011 | Apparao | ................ | G06Q 10/06 |
| | | | | 726/1 |
| 2012/0179808 A1 * | 7/2012 | Bergkvist | ............... | H04L 67/02 |
| | | | | 709/223 |
| 2014/0105399 A1 * | 4/2014 | Lin | ....................... | H04L 63/061 |
| | | | | 380/270 |
| 2017/0039390 A1 * | 2/2017 | King | ..................... | G06F 16/958 |
| 2017/0343360 A1 * | 11/2017 | Harikrishnan | ......... | G01C 21/28 |
| 2018/0307683 A1 * | 10/2018 | Lipka | ...................... | G06F 9/454 |
| 2019/0238614 A1 * | 8/2019 | Ballinger | ................ | G06F 9/451 |
| 2022/0253376 A1 * | 8/2022 | Shwarzman | ........ | G06F 11/3696 |
| 2022/0358083 A1 * | 11/2022 | Bhogle | ................... | G06F 18/24 |
| 2023/0196239 A1 * | 6/2023 | Lv | ...................... | G06Q 10/0633 |
| | | | | 705/7.27 |

* cited by examiner

*Primary Examiner* — Tadesse Hailu
(74) *Attorney, Agent, or Firm* — Patent Law Works, LLP

(57) ABSTRACT

A technique to support a walkthrough across different applications is disclosed. Walkthroughs between desktop applications is supported. Walkthroughs between a desktop application and a web application may also be supported. A central flow route processor may be provided to support routing walkthroughs between applications. The central flow route processor may include an application identity table to identify application identifiers, process names, and class names.

28 Claims, 6 Drawing Sheets

100

| Application Identity Table 125 | |
| --- | --- |
| Application ID | Process and Class Name |
| p7164_w123 | Chrome_Teams |
| p7264_w234 | HND**Exceedra |
| o o o | |
| Application ID M | Process and Class Name M |

Application Container 1,
Example Application ID
p7164_w123

Application Container 2,
Example Application ID
p7264_w234 o o o

Application Container
M,
Application ID M

Fig. 1B

{
"ProcessName":"Teams",
"Class":"Chrome_WidgetWin_1"
}

Teams_Chrome__WidgetWin_1

P 12452    W 4414

Process Id    Window Handle Id

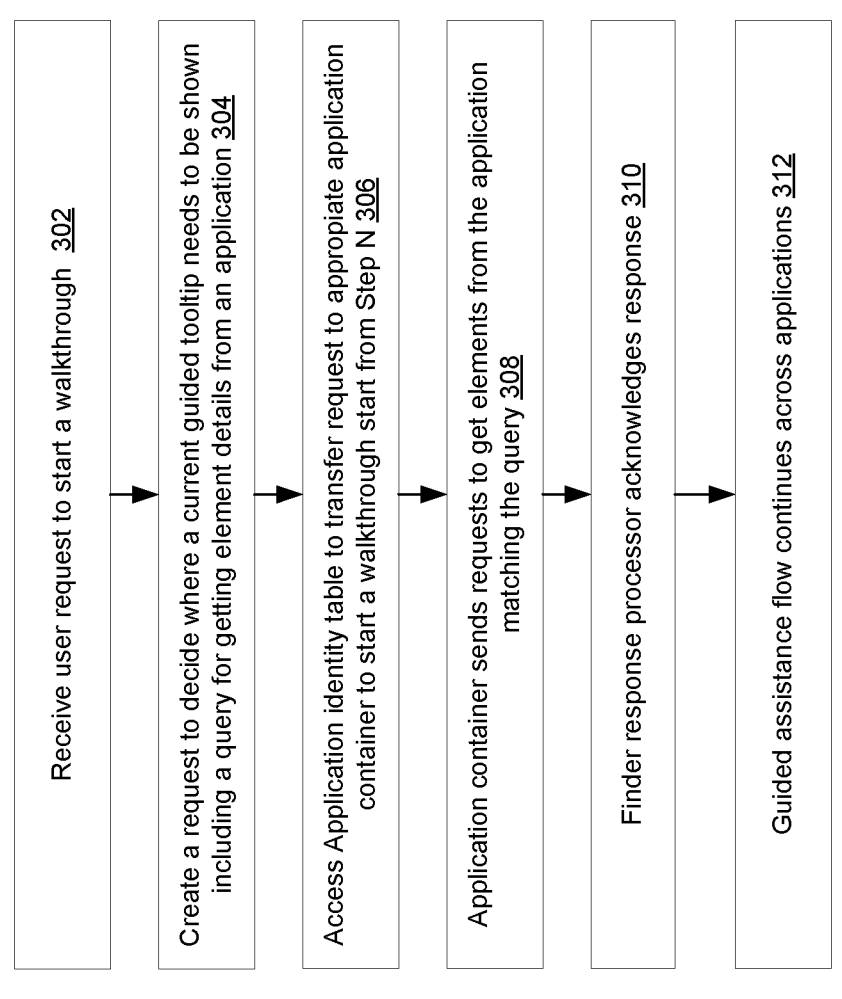

Receive user request to start a walkthrough 302

Create a request to decide where a current guided tooltip needs to be shown including a query for getting element details from an application 304

Access Application identity table to transfer request to appropiate application container to start a walkthrough start from Step N 306

Application container sends requests to get elements from the application matching the query 308

Finder response processor acknowledges response 310

Guided assistance flow continues across applications 312

Fig. 3 wfxflow://flow=<flow_id>&process=<processName>&class=<class>

Click on link from browser or other apps 402

Request permission to open flow transfer utility 404

Start flow transfer utility 406

Flow transfer utility writes to file 408

Player reads from file while showing iframe to start walkthrough 410

No need to restart player since clicking link invokes separate app

CROSS-APPLICATION WALKTHROUGH GUIDES FROM DESKTOP APP TO DESKTOP APP, DESKTOP APP TO BROWSER AND BROWSER TO DESKTOP APP

BACKGROUND

A digital adoption platform (DAP) is a type of software that is layered on top of another software app or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip as part of a walkthrough of an application, where a walkthrough provides guidance for using a software product. Background information on an example DAP implementation is found in various sources, including U.S. Pat. No. 11,372,661 assigned to Whatfix Private Limited, the contents of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators of the product can create content, record a flow, and the content is played back the same flow as and when required when end-user clients navigate the client application.

However, there are a variety of technical problems that have prevented supporting DAP across different desktop applications, i.e., from a desktop app to another desktop app. There are also a variety of technical problems that have prevented supporting DAP across combinations of desktop applications and web apps, such as from a desktop app to a web app, or from a web app to a desktop app.

SUMMARY

A technique to support a walkthrough across different applications is disclosed, such as walkthroughs between desktop applications, and walkthroughs between a desktop application and a web application. In one implementation, a central flow route processor may be provided to support routing walkthroughs between applications. The central flow route processor may include an application identity table to identify application identifiers, process names, and class names.

In one implementation, a system for supporting digital adoption platform (DAP) walkthroughs across target applications, includes a flow processor configured to support communication of flow state information between walkthrough applications and route a walkthrough between at least one of: 1) between two or more desktop applications, 2) between a desktop application and a web application, and 3) between a web application and a desktop application.

In one implementation, the flow processor identifies, for an application, an application identifier (ID) and a corresponding process and class name. In some implementation, the flow processor utilizes an application identity table to identify applications and associated process and class information for each application.

In one implementation, the flow processor monitors a flow identifier (ID) associated with a browser extension for web apps and a flow ID associated with a custom protocol for desktop apps. In some implementations, the flow processor supports communication of flow state information between different desktop applications. In some implementations, the flow processor supports communication of flow state information between a desktop application and a web application.

One implementation also includes a DAP guidance system and an application programming interface (API), wherein the flow processor includes a response request processor configured to generate a finder response, in response to a finder request.

In one implementation, the flow processor is compatible with at least one of the Windows®, MAC®, and/or Linux® operating systems.

In one example of a method, the method includes starting a walkthrough on an application at a selected step N of the walkthrough, where N is a positive integer. A finder request is generated for selected step of the walkthrough. A process name and class name is obtained for the request of the application from an application identity table storing information on application identifiers and associated process names and class names. The request is transferred to an application container based on the process name and class name to start a new walkthrough starting from step N.

In one example, the method includes getting elements from an application matching a query corresponding to the request.

In one example, the method further includes using data present in a finder request to decide where a current guided tooltip needs to be shown.

In one example of the method, the walkthrough is routed between desktop applications.

In one example of the method, the walkthrough is routed between a desktop application and a web application.

In one example of the method, the walkthrough is routed between a web application and a desktop application.

In one example, the method includes transferring flow state information of a walkthrough across applications.

In one example, the method includes using custom protocol to transfer flow state information for desktop applications.

BRIEF DESCRIPTION OF THE DRAWINGS

FIG. 1B illustrates an example of an application identity table in accordance with an example implementation.

FIG. 3. is a flowchart of an example method to support cross-application walkthroughs between desktop applications in accordance with an implementation.

DETAILED DESCRIPTION

A technique is described that supports creating walkthroughs that span across different applications. An individual walkthrough for a particular application may have a sequence of steps in a guided assistance flow that may take the form of a help tip displayed on a graphical user interface based on a cursor position on a graphical user interface of an application. The technique may be used to span a guided assistance flow between different desktop applications. In some implementations, it may also be used to span across a combination of desktop application(s) and web application(s) such as from a desktop app to a web app, or from a web app to a desktop app This supports creating walkthroughs that provide a guided assistance flow that continues across different applications.

Figure 1A:
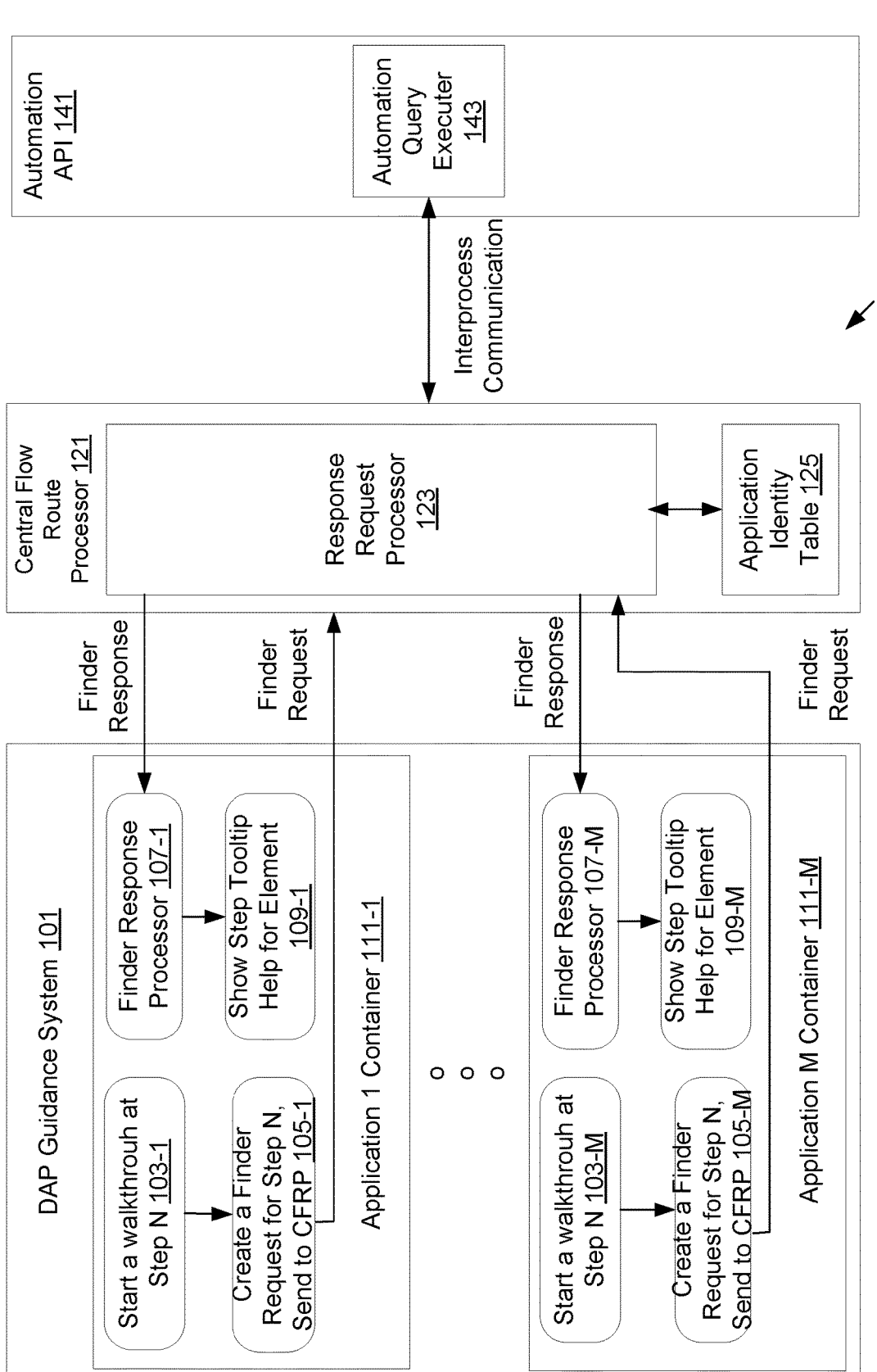
FIG. 1A illustrates a cross-application instruction system in accordance with an example implementation.

Referring to FIG. 1A, in one example of an interaction system 100, there are three main components. There is a DAP guidance system 101. This is the system a user interacts with. The user can trigger a guided assistance flow from one of the visible DAP widgets. In one implementation, when a walkthrough is initiated by the user, a relevant element is found using DAP element identification algorithms and a DAP guided assistance tooltip is drawn on the user interface.

In one implementation, each different application supported for providing DAP guided assistance has assigned to it an application container 111 and a unique identifier whose mapping is stored in the Application Identity Table 125 of a central flow route processor (CFRP) 121. For example, consider as an example a first application that is a desktop application has a Web container uniquely identified by a first unique ID. Inside the first web container 111-1 a DAP application is embedded, which takes care of providing guided assistance to the user on the user application.

Consider now a second application which is a web application. A second container 111-2 may be an application web container which is mapped to a user application different from the first application, such as a web application. The web application will have a second container identified by a second unique ID. The container can be enabled via a web extension in the browser. Inside this second container the DAP is embedded application which takes care of providing guided assistance to the user on the web browser.

In the most general case, there can be an arbitrary integer positive number, M of containers and applications running, and DAP guidance assistance can be provided across different applications, including desktop and web applications. The number M denotes a variable number of applications.

Each application container may have a unique ID identifying whether the corresponding application is a particular desktop application or a particular type of web application. There can be any reasonable number of web applications and desktop applications running at a given time, and DAP guidance assistance can be provided across all running applications. This approach is compatible with spanning across different desktop applications and spanning between desktop applications and web applications.

In one implementation, the CFRP 121 is the system which works behind the scenes to keep track of all the desktop and web applications that the DAP Guidance system 101 makes available for guided assistance. In one implementation, CFRP 121 implements a process that supports routing walkthroughs across multiple applications.

In one implementation, the CFRP 121 supports a central message communication mechanism to exchange the state of running a walkthrough across applications, such as across different desktop applications or across combinations of desktop and web. This is one of the features that supports routing walkthroughs across different applications. In one implementation, guided assistance is supported for browser-based apps (also referred to as web apps) and for desktop-based apps.

In one implantation, a web app walkthrough can be started by passing a flow_id, which is the ID of the flow (e.g., a flow value) through a custom URL. The application to be accessed must have a DAP application integrated into it to be able to read the flow and be triggered by the flow value. In one implementation, the flow_id is an identifier, such as an ID parameter (e.g., as an example,_wfx_flow value.) After a web page finishes loading, the flow_id can be used to start a walkthrough guide. The communication of contextual state information for web apps can include using browser extensions to maintain context across web apps.

In browser-based web apps, a browser extension can keep track of all the windows and tabs opened and closed through a common shared background context. The background context can also be maintained through service workers. A central process for browser-based web apps can be used to keep track of all browser-based web apps and help in message or event communication between open tabs or windows. For example, for web app, a sample url is: https://example.com?_wfx_flow=<flow-id>

However, for a desktop app, a custom protocol can be used to maintain context across desktop apps or across a desktop app and a web application. When it comes to desktop applications, conventional browser extensions can't be used to take care of maintaining the context across desktop applications. This has prevented providing guided assistance walkthroughs across desktop apps. This has also prevented providing a walkthrough that spans across a browser application and desktop application because these two different systems have no central message communication mechanism to exchange the state of a running walkthrough to allow cross system walkthroughs.

In the Windows® operating system, a custom protocol for desktop apps can be created using Asynchronous pluggable protocols technology. Asynchronous pluggable protocols enable developers to create pluggable protocol handlers that work on Internet explorer and other browsers. A custom Uniform Resource Identifier (URI) can be used to register and trigger an application in the Windows® operating system. Once the application has successfully launched, command-line parameters can be used to retrieve the URI that launched it which provide optional parameters for consumption. This permits a communication channel to be formed between a browser and a desktop application. It will be understood that analogous approaches may be used for other operating systems that have analogous custom protocols.

In one implementation, the CFRP 121 provides a central message communication mechanism that supports communication between different applications and mimics the behavior of a browser extension's central background process. In one implementation, the central flow route processor 121 exchanges the state of any running walkthrough guide to support continuing guiding the user across applications.

In one implementation, the CFRP 121 includes a request and response processor 123 to support receiving finder requests and issuing finder responses for the DAP guidance system 101 to find elements for a particular walkthrough step (e.g., Step N, where N is an arbitrary positive integer number such as Step 1, 2, 3 . . . ) and show the correct tooltip help.

An API 141 includes an automation query executor 143. The API provides access to the application elements tree of a graphical user interface, as discussed below in more detail.

In regard to FIG. 1A, it will be understood that the DAP guidance system 101, CFRP 121, and API 142 may be implemented at least in part on DAP software executing on a user's computer. For example, interprocess communication may be used to communicate between the CFRP 121 and the API 141. The various major processors illustrated in FIG. 1A may be implemented as computer software instructions executing on a user's computer. However, more generally it will be understood that at least some of the processing could be performed via a network computing device or a cloud-based service in terms of alternate implementation possibilities.

Example of Guided Assistance Flow Continuing from One Desktop Application to Another Desktop Application In one implementation a DAP guidance system 101 supports a walkthrough as a guided assistance flow that includes a series of steps with each step containing information such as a process name, element identification properties, step completion actions, and window details.

In one implementation, when running a guided assistance flow, if a step must jump from one app to another app, there needs to be a trigger at the step completion that is initiated based on user interaction. At each step completion, a check is performed to determine if the next step process name and class name is different from the application where the flow is currently running.

In one implementation, during the check done at step completion, if the process and class name stored in the step object are different, then a message is generated and forwarded to the CFRP 121, which in one implementation keeps track of all the processes associated with a user account. This CFRP 121 maintains an Application Identity Table 125 which contains a record for each instance of the application opened by the user. The records in the Application Identity Table 125 are used as a resource to aid in providing guided help to the user.

As an example, the Application Identity Table 125 may support two or more desktop applications or combinations of desktop applications and web applications.

In one implementation, a check step is performed for the appropriate process in the Application Identity Table 125 and its process and class name combination are compared with the one present in the current step object.

In one implementation, the step object is forwarded to the appropriate process to continue playing the guided flow. If the step is supposed to play on a different application, then that application is brought to the foreground for continuation of user workflow.

Consider a guided assistance flow continuing from one desktop application to another desktop application. A user may start a walkthrough at Step N in block 103. A finder request is created for Step N and sent to the CFRP 121 in block 105. The CFRP 121 returns a finder responder to the finder response processor 107, which in turn is used to show the step tooltip help for the element in block 109.

Figure 2A:
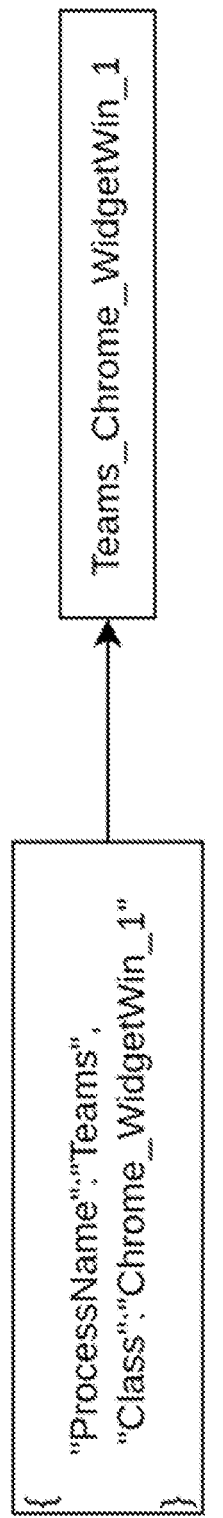
FIG. 2A illustrates an example of a mapping in an application identity table in accordance with an implementation.

Referring to FIG. 1A, in one implementation, the Application Identity Table 125 is an active mapping for all applications, for which DAP guidance is supported, of their unique identifiers and their respective unique containers. FIG. 1B illustrates in more detail an example of an Application Identity Table 125 and corresponding application containers. In one implementation, as illustrated in FIG. 2A, the application uniqueness is identified by the combination of Process Name and Class Name. However, more generally, other identification techniques could be used.

Figure 2B:
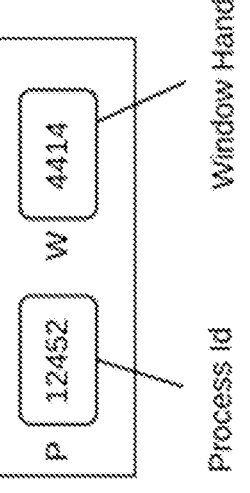
FIG. 2B illustrates an example in which a container includes a process ID and a Windows® handle ID in accordance with an implementation.

Referring to FIG. 2B, in one implementation, each application container is a unique per application instance. This addresses the situation in which there are multiple instances of the same application running on the user machine with the same application ID, having the same combination of process name and class name. Even if there is more than one instance of an application, there is a chance that the application instances are running as a single process so they may have the same process identifier (Id). What differentiates them in such a case is that they always have a different window handle Id. Thus, in one implementation, a container ID includes a combination of a processId and a windowHandle Id.

Referring again to FIG. 1A, in one implementation, the CFRP 121 includes a Request and Response Processor 123. The Request and Response Processor (RARP) 123 is the part of the system that takes care of managing the requests coming from DAP guidance system 101 and responses coming from API 141. The Request and Response Processor 123 also takes care of checking the Application Identity Table 125 at each step to take care of routing the flow transfer to appropriate application containers 111 based on the request data. The request data carries information about the process and class name where guided assistance is needed to be provided.

Referring to FIG. 1A, in one implementation the API 141 is a system that provides access to the application elements tree of a graphical user interface. Based on the query sent by the DAP guidance system 101, it gets the elements matching the query and sends them back to the DAP guidance system 101 for further processing, which includes filtering through the list of all found elements and finding the possible element where the tooltip needs to be shown.

Referring to FIG. 3, a process of Desktop-to-Desktop flow transfer is now described that uses a system similar to that of FIG. 1A. In block 302, a user starts a walkthrough on an application. In block 304, using the data available in the walkthrough object, a finder request is created to be sent to the CFRP 121.

In one implementation, the RARP 123, which implements a process to use the data present in a finder request to decide where the current guided tooltip needs to be shown. The finder request contains a query for getting element details from the application. In block 305, the RARP 123 looks into the Application Identity Table 125 for the process name and class name combination as provided in the request object. Based on the information from the Application Identity Table 125, the request is transferred by the RARP 123 to the appropriate application container to start a new walkthrough starting from Step N.

In block 308, the application container 111 then sends a request to the RARP 123 to get elements from the application matching the query.

In block 310, the finder response processor 107 acknowledges the response coming from the CFRP 121 and shows the tooltip.

In block 312, a guided assistance flow continuing from a web application in a browser to a desktop application.

Example of Guided Assistance Flow Continuing from a Web App in a Browser to a Desktop App In one implementation, flows for the web are triggered using an application link URL with a parameter flow_id identifying a walkthrough to be started for a user. An example of the link is the one below:

https://mail.google.com/mail?_wfx_=86d06b00-a5cc-
11ec-beef-000d3a5780c8 #label/Jira The '_wfx_,' parameter here contains the id of the flow that needs to be triggered when the page load completes in the browser.

In one implementation, for the desktop solution a similar mechanism is built to trigger flows using a custom protocol. In the Windows® operating system, a custom protocol can be created using asynchronous pluggable protocols technology. Asynchronous pluggable protocols enable developers to create pluggable protocol handlers that work on Internet explorer and other browsers. The custom URI scheme can be used to register and trigger any application in the windows operating system. Once the application has successfully launched, it can use command-line parameters to retrieve the URI that launched it which means we can provide optional parameters for consumption. When opened in the browser, it starts a flow transfer utility which writes flow information into a file. In one implementation, a DAP player system is implemented to read flow information from this file and continue the flow.

In one implementation, the same URL is triggered from within the widgets such as flow, self help, tasklist etc. The URL should start the flow on the target application when the link is clicked.

Figure 4:
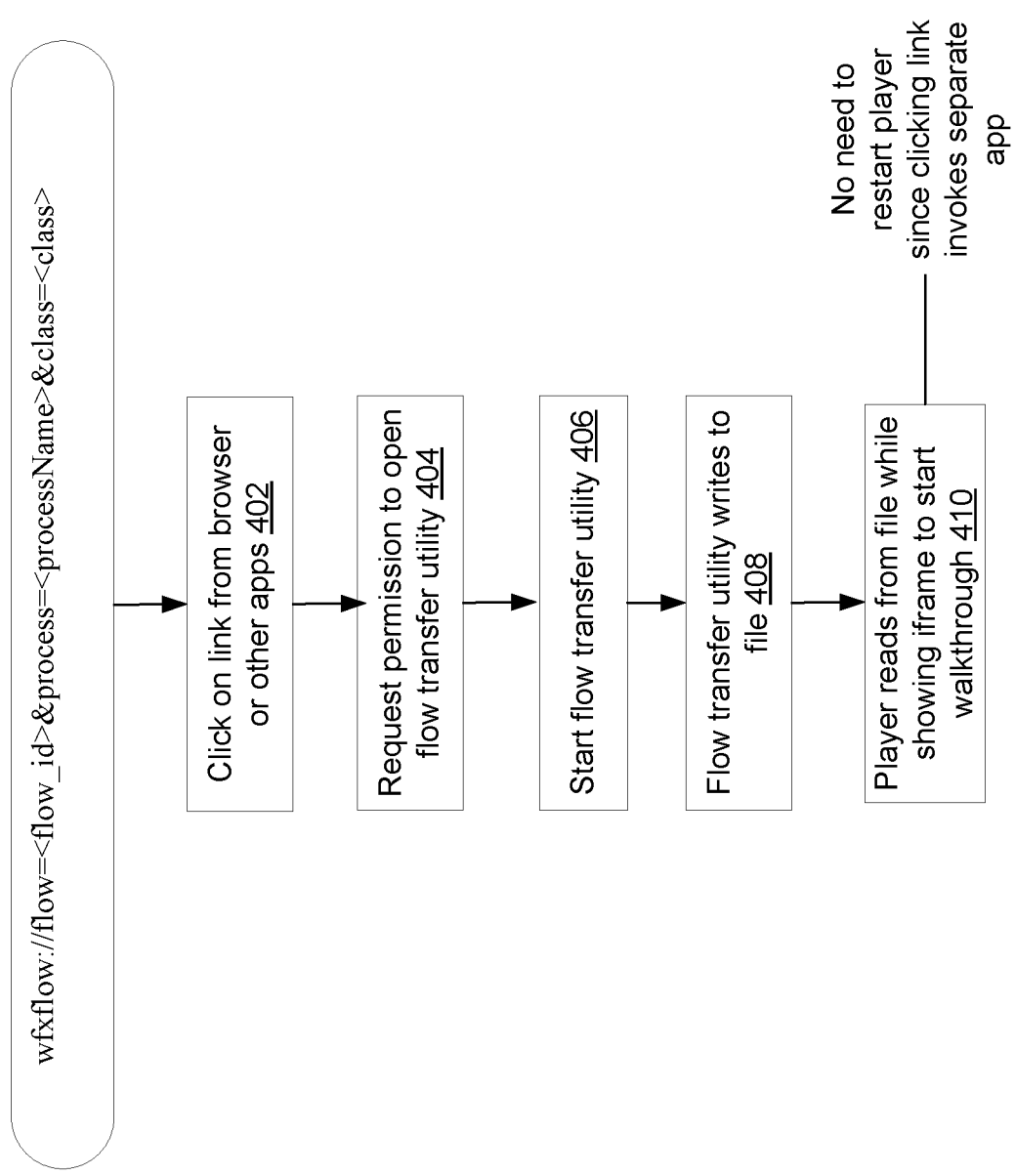
FIG. 4 is a flowchart of an example method to support cross-application walkthroughs between desktop apps and web apps in accordance with an implementation.

FIG. 4 is a flowchart of an example of events that occur when a user clicks on a link. The description for each step is as follows: In block 402, the user clicks link from browser or any other application—The interaction to switch a flow from a web to desktop application will be via a link. An example format of the link is as follows:

wfxflow://
flow=<flow_id>&process=<processName>&class=<class>
Flow_id—The unique id of the flow
processName—The name of the desktop application process
Class—The class of the desktop application process In block 404 is a request is made for permission to open flow transfer utility. To open a desktop application from browser, the process registers a URL protocol, which will redirect the URL to a Windows® application. A flow transfer utility is triggered whenever click on the link is detected. The browser will prompt the user for permission to open the flow transfer utility whenever the link is clicked.

In block 406, there is a start flow transfer utility (util.) Once the user gives permission to open a flow transfer utility, it will be launched by the browser. In one implementation, the entire link is passed as an argument to the flow transfer utility.

In block 408, the flow transfer utility writes to a shared file database which could even be a JSON file in a commonly accessible location. In one implementation, the flow transfer utility will write the flow id to this local storage file.

In block 410, the DAP guided assistance system 101 listens to changes made to the shared database file and reads the flow info from local file. When the user brings the desktop application to the foreground the guided walkthrough will start and the user will receive help on the application without any delay or interruptions. In this entire process, the DAP guided assistance system never restarts which is usually the case in the windows URL protocol handler as we are using a different lightweight process for ensuring the communication between web application, desktop application and the DAP guided assistance system.

The system 100 can be implemented to be leverage off support for Windows® and for Mac®/Linux®. For Mac® and Linux®, the approach includes supporting custom protocol registration, so this solution can be extended to them as well. This includes registering the protocol in the respective Mac® and/or Linux® installations, which will allow opening applications from the browser via links.

Figures 5A, 5B:
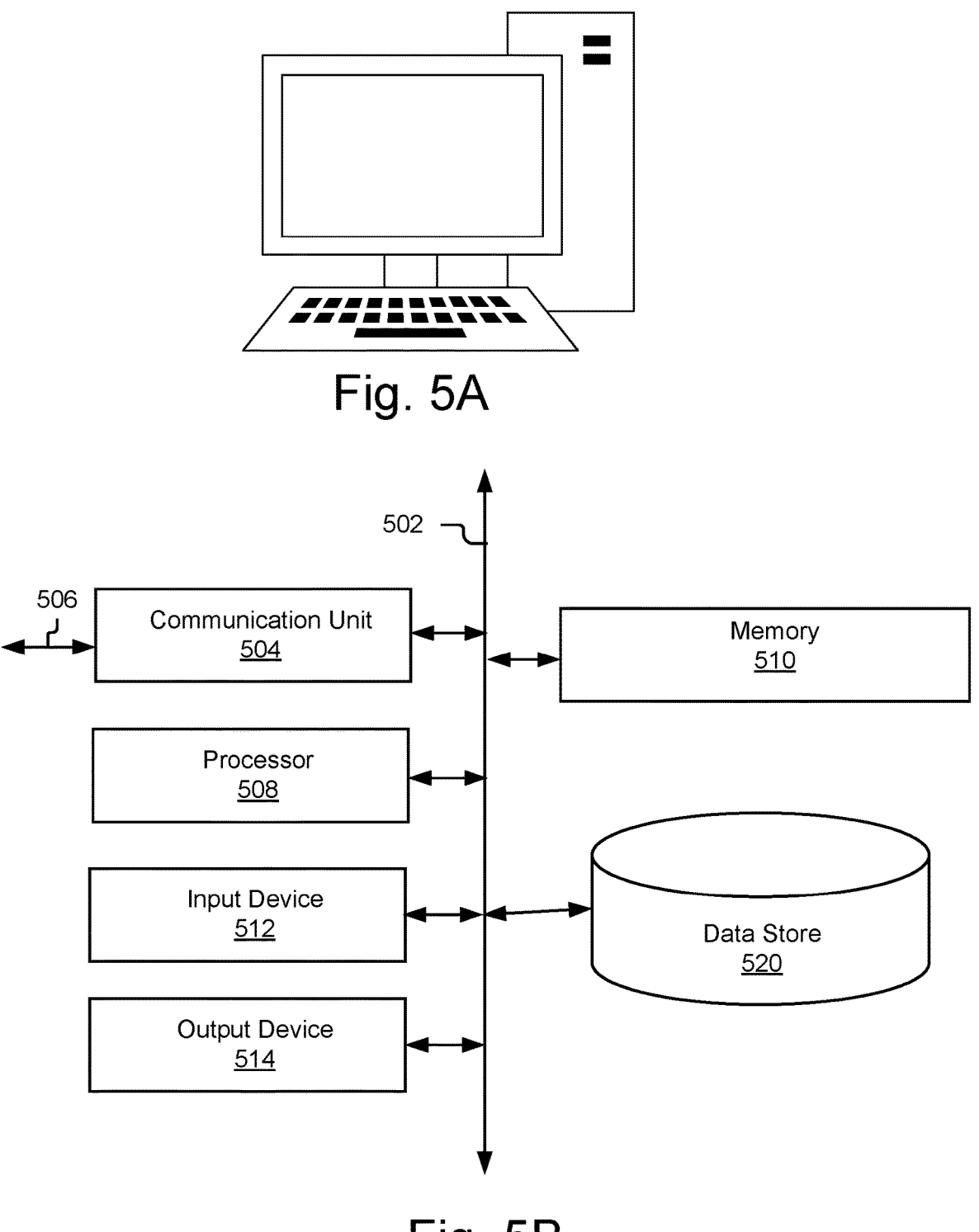
FIGS. 5A and 5B illustrate a general computer environment in accordance with an implementation.

It will be understood that instruction system 100 may be implemented to provide DAP assistance as an end user navigates an application. The previously described methods may be implemented as computer program instructions executed on a computer processor. Referring to FIGS. 5A and 5B, the instruction system 100 may be implemented to support providing DAP guidance on a user's computer as illustrated in FIG. 5A which may have conventional computer features such as a memory 510, data store 520, output device 514, input device 512, processor 508, and network computing unit 504 to support network communications 506, and a data bus 502 for internal components to communicate with each other.

Some of the benefits of the technique is that is makes it possible to create walkthroughs that are routed across different desktop applications and between desktop applications and web applications. When it comes to desktop applications, there previously haven't been browser extension to take care of maintaining the context across desktop applications. Also, in the past it wasn't possible to run a walkthrough which spans across a browser application and desktop application because these in the past two different systems had no central message communication mechanism to exchange the state of a running walkthrough to allow cross system walkthroughs.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A system for supporting digital adoption platform (DAP) walkthroughs across target applications for uninterrupted guidance, the system comprising:

a flow processor configured to support communication of full contextual flow state information between walkthrough applications and monitor a custom protocol associated exclusively with initiating and routing state to a desktop application, wherein the custom protocol is utilized to receive flow state information; and route a walkthrough the full contextual flow state information across applications to enable an uninterrupted continuation of the walkthrough between at least one of: 1) between two or more distinct desktop applications, 2) between a desktop application and a web application, and 3) between a web application and a desktop application, wherein the routing, when involving a desktop application, bypasses a reliance on detecting a subsequent advancement condition within a receiving application to initiate the continuation of the walkthrough.

2. The system of claim 1, wherein the flow processor identifies, for an application, an application identifier (ID) and a corresponding process and class name to ensure accurate inter-environment routing of the full contextual flow state information.

3. The system of claim 2, wherein the flow processor utilizes an application identity table to identify a unique identifier for each application and associated process and class information for real-time routing of the full contextual flow state information.

4. The system of claim 1, wherein the flow processor monitors a flow identifier (ID) associated with a browser extension for web apps and a flow ID associated with the custom protocol for desktop apps is utilized to trigger a flow transfer utility configured to write the full contextual flow state information into a shared local flow data store that is subsequently read by a DAP player embedded in a receiving desktop application to initiate the uninterrupted continuation of the walkthrough.

5. The system of claim 4, wherein the flow processor supports the uninterrupted continuation of flow state information between two different desktop applications via the flow transfer utility and the shared local flow data store.

6. The system of claim 4 wherein the flow processor supports the uninterrupted continuation of flow state information between two different desktop applications via the flow transfer utility and the shared local flow data store.

7. The system of claim 1, further comprising a DAP guidance system and an application programming interface (API), wherein the flow processor includes a response request processor configured to generate a finder response, in response to a finder request, to facilitate immediate display of a guided tooltip by a receiving desktop application upon uninterrupted continuation.

8. The system of claim 1, wherein the flow processor is compatible with the Windows®, MAC®, and/or Linux® operating systems and is configured to utilize the custom protocol and a flow transfer utility to achieve seamless state transfer across the Windows®, MAC®, and/or Linux® operating systems.

9. The system of claim 1, wherein the flow processor communicates full contextual flow state information via a custom protocol-initiated transfer mechanism to a shared local flow data store to maintain uninterrupted context of the walkthrough across desktop applications.

10. The system of claim 1, wherein the flow processor exchanges the state of a running walkthrough using a custom protocol-initiated file transfer mechanism to support providing a guided assistance flow that continues across different applications without restart or delay or dependency on detected advancement conditions.

11. A system for supporting digital adoption platform (DAP) walkthroughs across target applications for uninterrupted guidance, the system comprising:

a DAP guidance system having a plurality of application containers for a plurality of applications, wherein each application container is uniquely addressable per concurrently running desktop application instance;

a flow processor configured to support communication and exchange of flow state information between the application containers; and route a walkthrough based on a unique identification between at least one of: 1) between two or more distinct desktop applications, 2) between a desktop application and a web application, and 3) between a web application and a desktop application, wherein the flow processor is further configured to uniquely identify a target desktop application instance for routing using a combination of a process identifier (ID) and a window handle ID.

12. The system of claim 11, wherein the flow processor identifies, for a desktop application instance, a unique identifier comprising a combination of an application identifier (ID), a process name, and a window handle ID to ensure fine-grained routing across multiple concurrently running desktop application instances.

13. The system of claim 12, wherein the flow processor utilizes an application identity table to identify the unique identifier for each desktop application instance and associated process and class information for real-time routing of full contextual flow state information.

14. The system of claim 11, wherein the flow processor monitors a flow identifier (ID) associated with a browser extension for web apps and a flow ID associated with a custom protocol for desktop apps is utilized to transfer flow state information for uninterrupted continuation of the walkthrough across desktop applications.

15. The system of claim 14 wherein the flow processor supports the uninterrupted continuation of flow state information between two different desktop applications via a flow transfer utility initiated by the custom protocol.

16. The system of claim 14 wherein the flow processor supports the uninterrupted continuation of flow state information between a desktop application and a web application via a flow transfer utility initiated by the custom protocol.

17. The system of claim 11, wherein the DAP guidance system generates, for an application container, a finder request for a step of the walkthrough, wherein the flow processor includes a response request processor configured to generate a finder response to the finder request to facilitate immediate display of a guided tooltip by a receiving desktop application upon uninterrupted continuation.

18. The system of claim 11, wherein the flow processor is compatible with the Windows®, MAC®, and/or Linux® operating systems and is configured to utilize the custom protocol to achieve seamless state transfer between desktop applications across the Windows®, MAC®, and/or Linux® operating systems.

19. The system of claim 11, wherein the flow processor communicates using the unique identification combination of process ID and window handle ID to ensure accurate state transfer to a designated, concurrently running desktop application instance.

20. The system of claim 11, wherein the flow processor exchanges the state of a running walkthrough to support communication of full contextual flow state information via a custom protocol-initiated flow transfer utility to the application instance identified by the unique identifier.

21. A method for routing a walkthrough across applications, comprising:

starting a walkthrough on an application at a selected step N of the walkthrough, where N is a positive integer;

generating a finder request for selected step of the walkthrough;

obtaining a process name and class name for the finder request of the application from an application identity table storing information on application identifiers and associated process names and class names; and transferring the finder request to an application container based on the process name and class name to start a new walkthrough starting from step N.

22. The method of claim 21, further comprising getting elements from an application matching a query corresponding to the request.

23. The method of claim 21, further comprising using data present in the finder request to decide where a current guided tooltip needs to be shown.

24. The method of claim 21, wherein walkthrough is routed between two different desktop applications and flow state information is communicated between the two different desktop applications.

25. The method of claim 21, wherein the walkthrough is routed between a desktop application and a web application and flow state information is communicated between the desktop application and the web application.

26. The method of claim 21, wherein the walkthrough is routed between a web application and a desktop application, and flow state information is communicated between the web application and the desktop application.

27. The method of claim 21, further comprising transferring flow state information of the walkthrough across applications.

28. The method of claim 27, wherein a custom protocol is utilized to maintain context to transfer flow state information for desktop applications.

* * * * *